US007203723B2

(12) United States Patent
Ogawa

(10) Patent No.: US 7,203,723 B2
(45) Date of Patent: Apr. 10, 2007

(54) UPDATE SYSTEM, UPDATE CLIENT APPARATUS, UPDATE SERVER APPARATUS, AND PROGRAMS

(75) Inventor: Kazuhiro Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 689 days.

(21) Appl. No.: 10/101,319

(22) Filed: Mar. 20, 2002

(65) Prior Publication Data

US 2002/0138567 A1    Sep. 26, 2002

(30) Foreign Application Priority Data

Mar. 21, 2001  (JP) ............................. 2001/080415

(51) Int. Cl.
*G06F 15/16*   (2006.01)
*G06F 11/00*   (2006.01)
*G06F 9/44*    (2006.01)
*G06F 15/177*  (2006.01)

(52) U.S. Cl. .................. 709/203; 717/168; 717/171; 709/220; 714/48

(58) Field of Classification Search ........ 717/168–173; 713/1, 100; 709/223, 220; 347/19; 711/114
See application file for complete search history.

(56) References Cited

U.S. PATENT DOCUMENTS

| 5,960,189 A * | 9/1999 | Stupek et al. ............... 717/169 |
| 6,167,567 A * | 12/2000 | Chiles et al. ............... 717/173 |
| 6,360,362 B1 * | 3/2002 | Fichtner et al. ............ 717/168 |
| 6,668,374 B1 * | 12/2003 | Sten et al. .................. 717/173 |
| 6,675,258 B1 * | 1/2004 | Bramhall et al. ........... 711/114 |
| 6,802,586 B2 * | 10/2004 | Forman ....................... 347/19 |
| 2002/0059515 A1 * | 5/2002 | Hagiwara et al. ........... 713/100 |
| 2004/0068721 A1 * | 4/2004 | O'Neill et al. .............. 717/168 |
| 2004/0163081 A1 * | 8/2004 | Martwick .................... 717/168 |
| 2004/0199615 A1 * | 10/2004 | Philyaw ...................... 709/220 |
| 2004/0215755 A1 * | 10/2004 | O'Neill ....................... 709/223 |
| 2005/0060527 A1 * | 3/2005 | Philyaw ........................ 713/1 |

FOREIGN PATENT DOCUMENTS

| JP | H02-263231 A | 10/1990 |
| JP | 7-225724 A | 8/1995 |
| JP | H09-297679 A | 11/1997 |
| JP | 10-74143 A | 3/1998 |
| JP | H10-074143 A | 3/1998 |
| JP | 2001-5649 A | 1/2001 |

* cited by examiner

*Primary Examiner*—Meng-Al T. An
*Assistant Examiner*—Insun Kang
(74) *Attorney, Agent, or Firm*—Sughrue Mion, PLLC

(57) ABSTRACT

An update client sends to an update server which is connected to the update client via a communication line, identification information of a driver and firmware which are included in a disk array system, and identification information of an error event which has occurred in the disk array system. The update server determines whether update of the driver and the firmware is necessary or not in accordance with a combination of the supplied identification information of the driver, the firmware, and the error event. In a case where it is determined that update is necessary, the update server sends to the update client, update data corresponding to the combination of the supplied identification information of the driver, the firmware, and the error event. The update client updates both of the driver and the firmware using the supplied update data.

18 Claims, 8 Drawing Sheets

COMBINATION TABLE 181

| FIRMWARE / DRIVER | 1.00.00 | 1.00.09 | 1.02.10 | 2.00.04 |
|---|---|---|---|---|
| V1.00B00 | #01 | #05 | #09 | #14 |
| V1.00B10 | #02 | #06 | #10 | #15 |
| V1.20B26 | #03 | #07 | #11 | #16 |
| V1.30B56 | #04 | #08 | #12 | #00 |

FIG. 2A

ERROR CORRESPONDENCE TABLE 182

| UPDATE NUMBER / ERROR EVENT | ID:00 | ID:10 | ID:20 |
|---|---|---|---|
| #00 | #20 | #30 | #50 |
| #01 | #21 | #31 | #51 |
| ..... | ..... | ..... | ..... |
| #14 | #34 | #44 | #64 |
| #15 | #35 | #45 | #65 |

FIG. 2B

UPDATE DATA TABLE 183

| INFORMATION / UPDATE NUMBER | STORAGE AREA | DATA NAME | IDENTIFICATION INFORMATION |
|---|---|---|---|
| #00 | UNNECESSARY | UNNECESSARY | UNNECESSARY |
| #01 | DISK01 | DATA01 | V1.0.01 |
| #02 | DISK02 | DATA02 | V1.1.02 |
| ..... | ..... | ..... | ..... |
| #63 | DISK63 | DATA63 | V1.4.63 |
| #64 | DISK64 | DATA64 | V1.5.64 |
| #65 | DISK65 | DATA65 | V1.5.65 |

FIG. 2C

UPDATE SYSTEM, UPDATE CLIENT APPARATUS, UPDATE SERVER APPARATUS, AND PROGRAMS

BACKGROUND OF THE INVENTION

1. Field of the Invention

The present invention relates to an update system, an update client apparatus, an update server apparatus, and programs for updating firmware and a driver for a disk array system.

2. Description of the Related Art

A disk array system includes a plurality of disk devices. Data is dispersed and stored in the plurality of disk devices. Thus, in case one disk device breaks down, the original data can be recovered based on information stored in the rest of the disk devices. Due to this merit, the disk array system is used as a storage system having high reliability.

The disk array system comprises a disk controller for controlling the plurality of disk devices, and a CPU on which an operating system and utility programs including a driver for the disk controller are activated.

The disk controller comprises an MPU controlled by firmware. The firmware is stored in a memory included in the disk controller, such as an EEPROM, or the like.

In order to correct a bug in the driver and to improve performance of the driver, the driver needs to be updated. And in order to correct a bug in the firmware and to improve performance of the firmware, the firmware needs to be updated.

Since a driver is software in its real sense, it can be updated like ordinary software. In other words, an update program for ordinary software can be used to update a driver.

On the other hand, since firmware is closely related to hardware, an update program for ordinary software cannot be used for updating firmware.

Matters to be paid attention when a driver or firmware is updated are, determining clearly whether update is really necessary for those to be updated, and obtaining appropriate update data.

When users of a driver or firmware do such determination and obtain update data, it costs users a lot of labor, And users may make a wrong determination about the necessity of update, and may choose wrong update data. Therefore, techniques for supporting update of a driver or firmware have been proposed.

Techniques for updating a driver (software) are disclosed in Unexamined Japanese Patent Application KOKAI Publication No. H7-225724, and in Unexamined Japanese Patent Application KOKAI Publication No. 2001-5649.

The technique disclosed in the Unexamined Japanese Patent Application KOKAI Publication No. H7-225724 determines whether the version of activated software is the latest or not by using version information of the software. Then, in a case where the version is not the latest one, the software is updated.

The technique disclosed in the Unexamined Japanese Patent Application KOKAI Publication No. 2001-5649 extracts only differences between an older version and a new version, that is, extracts only renewed portions, and updates the older version software to the latest version software using the extracted portions.

A technique for updating firmware is disclosed in Unexamined Japanese Patent Application KOKAI Publication No. H10-74143.

In a case where a plurality of firmware (micro programs) are activated in a system, the plurality of firmware keep in contact with each other and build up one system. Therefore, according to the technique disclosed in Unexamined Japanese Patent Application KOKAI Publication No. H10-74143, firmware is updated only in a case where combination of the new version of firmware which is to be updated, and the present version of firmware which is not to be updated satisfies a predetermined condition.

None of the above publications discloses a system for updating both a driver and firmware collectively.

A driver of a disk array system controls a disk controller which is controlled by firmware. Thus, when the driver is to be updated, there are some cases that the firmware must be updated together.

In such a case, if a system for updating the driver and a system for updating the firmware are separately provided to users, users might cause a situation where only one of the driver and the firmware is updated and the other is not updated, due to users' lack of knowledge or carelessness. This may disturb coordination between the driver and the firmware, and may bring the disk array system into an unstable condition.

The techniques disclosed in the above referenced publications rely solely on static information such as version information when performing the updating operations. Therefore, drivers or firmware which have the same content may undergo a same updating operation, thus only a fixed updating process can be conducted, However, there is no need of updating all the software having the same content.

For example, in case of a plurality of disk array systems using drivers and firmware of the same version, some part of the plurality of disk array systems may cause an error event such as a timeout. This may be due to a slight difference in designs of disk controllers used, or due to other causes. To search out the exact cause may consume a lot of time, and may end up in vain.

In the above case where a specific error event is caused in a specific disk array system, only the driver and firmware of the disk array system having the trouble of the error event should be updated.

However, since the techniques of the above referenced publications are based only on static information to determine whether update is necessary or not, effective update as needed is not performed.

The disclosures of Unexamined Japanese Patent Application KOKAI Publication No. H7-225724, Unexamined Japanese Patent Application KOKAI Publication No H10-74143, and Unexamined Japanese Patent Application KOKAI Publication No. 2001-5649 are incorporated herein by reference.

SUMMARY OF THE INVENTION

Accordingly, it is an object of the present invention to provide an update system, update apparatuses, and programs for updating both a driver and firmware.

It is another object of the present invention to provide an update system, update apparatuses, and programs for performing effective update that suits the necessity.

To accomplish the above objects, an update system according to a first aspect of the present invention comprises:

an update client which updates a driver and firmware which are included in a disk array system; and an update server which is connected to the update client via a communication line, determines whether or not update of the driver and the firmware is necessary, and in a case where determining that the update is necessary, sends appropriate update data corresponding to combination of the driver and the firmware to the update client, wherein the update client updates both of the driver and the firmware using the update data supplied from the update server.

According to this invention, it is possible to update both of a driver and firmware effectively when necessity arises.

The update client may comprise:

an information sending unit which sends identification information for identifying the driver, and identification information for identifying the firmware to the update server; and an update unit which updates both of the driver and die firmware using the update data supplied from the update server.

The update server may comprise:

a necessity determination unit which determines whether or not the update is necessary in accordance with combination of the identification information of the driver and the identification information of the firmware which are supplied from the information sending unit;

a data determination unit which determines the update data in accordance with the combination of the identification information of the driver and the identification information of the firmware which are supplied from the information sending unit, in a case where the necessity determination unit determines that the update is necessary; and a data sending unit which sends the update data determined by the data determination unit to the update client.

The update server may further comprise a storage unit which stores a determination table which indicates whether the update is necessary or not, and specifies necessary update data in accordance with the combination of the identification information of the driver and the identification information of the firmware.

The necessity determination unit may determine whether the update is necessary or not by referring to the determination table using the identification information of the driver and the identification information of the firmware.

The data determination unit may determine the update data by referring to the determination table using the identification information of the driver and the identification information of the firmware.

The storage unit may further store a plurality of update data for updating both of the driver and the firmware.

The update server may further comprise a data retrieving unit which retrieves from the storage unit, the update data determined by the data determination unit.

The data sending unit may send the update data retrieved by the data retrieving unit to the update client.

The update client may be provided in the disk array system.

The update server may send to the update client, appropriate update data which not only corresponds to the combination of the driver and the firmware, but also corresponds to a kind of an error event which occurs in the disk array system.

The update client may comprise:

an information sending unit which sends to the update server, identification information for identifying the driver, identification information for identifying the firmware, and identification information for identifying an error event which occurs in the disk array system; and an update unit which updates both of the driver and the firmware using the update data supplied from the update server.

The update server may comprise:

a necessity determination unit which determines whether or not the update is necessary in accordance with a combination of the identification information of the driver, the identification information of the firmware, and the identification information of the error event which are supplied from the information sending unit;

a data determination unit which determines the update data in accordance with the combination of the identification information of the driver, the identification information of the firmware, and the identification of the error event which are supplied from the information sending unit, in a case where the necessity determination unit determines that the update is necessary; and a data sending unit which sends the update data determined by the data determination unit to the update client.

The update server may further comprise a storage unit which stores a determination table which indicates whether the update is necessary or not, and specifies necessary update data in accordance with the combination of the identification information of the driver, the identification information of the firmware, and the identification information of the error event.

The necessity determination unit may determine whether the update is necessary or not by referring to the determination table using the identification information of the driver, the identification information of the firmware, and the identification information of the error event.

The data determination unit may determine the update data by referring to the determination table using the identification information of the driver, the identification information of the firmware, and the identification information of the error event.

The storage unit may further store a plurality of update data for updating both of the driver and the firmware.

The update server may further comprise a data retrieving unit which retrieves from the storage unit, the update data determined by the data determination unit.

The data sending unit may send the update data retrieved by the data retrieving unit to the update client.

The update client may be provided in the disk array system.

An update system according to a second aspect of the present invention comprises:

a necessity determination unit which determines whether update of a driver and firmware which are included in a disk array system is necessary or not in accordance with a combination of die driver and the firmware;

a data determination unit which determines update data appropriate for updating both of the driver and the firmware in accordance with die combination of the driver and the firmware, in a case where the necessity determination unit determines that the update is necessary; and an update unit which updates both of the driver and the firmware using the update data determined by the data determination unit, The update system may further comprises an error occurrence determination unit which determines whether or not an error event has occurred in the disk array system.

In a case where the error occurrence determination unit determines that an error event has occurred, the necessity determination unit may determine whether the update is necessary or not, not only in accordance with the combination of the driver and the firmware but also in accordance with a kind of the error event which has occurred in the disk array system.

In a case where the error occurrence determination unit determines that an error event has occurred, the data determination -unit may determine the update data, not only in accordance with the combination of the driver and the firmware but also in accordance with a kind of the error event.

An update client apparatus according to a third aspect of the present invention updates both of a driver and firmware which are included in a disk array system, the apparatus comprising:

an information sending unit which sends identification information for identifying the driver and identification information for identifying the firmware to an external apparatus which stores a plurality of update data; and an update unit which updates both of the driver and the firmware using update data supplied from the external apparatus in accordance with a combination of the identification information of the driver and the identification information of the firmware.

The information sending unit may send to the external apparatus, identification information for identifying an error event which has occurred in the disk array system together with the identification information of the driver and the identification information of the firmware.

The update unit may update both of the driver and the firmware using update data supplied from the external apparatus in accordance with a combination of the identification information of the driver, the identification information of the firmware, and the identification information of the error event, An update server apparatus according to a fourth aspect of the present invention provides an external apparatus with update data for updating both of a driver and firmware which are included in a disk array system, the update server apparatus comprising:

a necessity determination unit which determines whether update of the driver and the firmware is necessary or not, in accordance with a combination of identification information for identifying the driver and identification information for identifying the firmware which are supplied from the external apparatus;

a data determination unit which determines the update data in accordance with the combination of the identification information of the driver and the identification information of the firmware which are supplied from the external apparatus, in a case where the necessity determination unit determines that the update is necessary; and a data sending unit which sends the update data determined by the data determination unit to the external apparatus.

The update server apparatus may receive from the external apparatus, not only the identification information of the driver and the identification information of the firmware but also identification information for identifying an error event which has occurred in the disk array system.

The necessity determination unit may determine whether the update is necessary or not in accordance with a combination of the identification information of the driver, the identification information of the firmware, aid the identification information of the error event which are supplied from the external apparatus.

The data determination unit may determine the update data in accordance with the combination of the identification information of the driver, the identification information of the firmware, and the identification information of the error event which are supplied from the external apparatus, in a case where the necessity determination unit determines that the update is necessary.

A program according to a fifth aspect of the present invention controls a computer to function as an update client apparatus which updates both of a driver and firmware which are included in a disk array system, the update client apparatus comprising:

an information sending unit which sends identification information for identifying the driver and identification information for identifying the firmware to an external apparatus which stores a plurality of update data; and an update unit which updates both of the driver and the firmware using update data supplied from the external apparatus in accordance with a combination of the identification information of the driver and the identification information of the firmware.

A program according to a sixth aspect of the present invention controls a computer to function as an update server apparatus which provides an external apparatus with update data for updating both of a driver and firmware which are included in a disk array system, the update server apparatus comprising:

a necessity determination unit which determines whether update of the driver and the firmware is necessary or not in accordance with a combination of identification information for identifying the driver and identification information for identifying the firmware which are supplied from the external apparatus;

a data determination unit which determines the update data in accordance with the combination of the identification information of the driver and the identification information of the firmware which are supplied from the external apparatus, in a case where the necessity determination unit determines that the update is necessary; and a data sending unit which sends the update data determined by the data determination unit to the external apparatus.

BRIEF DESCRIPTION OF THE DRAWINGS

These objects and other objects and advantages of the present invention will become more apparent upon reading of the following detailed description and the accompanying drawings in which:

FIGS. 2A to 2C are diagrams showing a determination table retained in a determination table retaining unit of a center system which constitutes the update system shown in FIG. 1;

DETAILED DESCRIPTION OF THE PREFERRED EMBODIMENTS

First Embodiment

An update system according to a first embodiment of the present invention will now be explained below with reference to the drawings.

Figure 1:
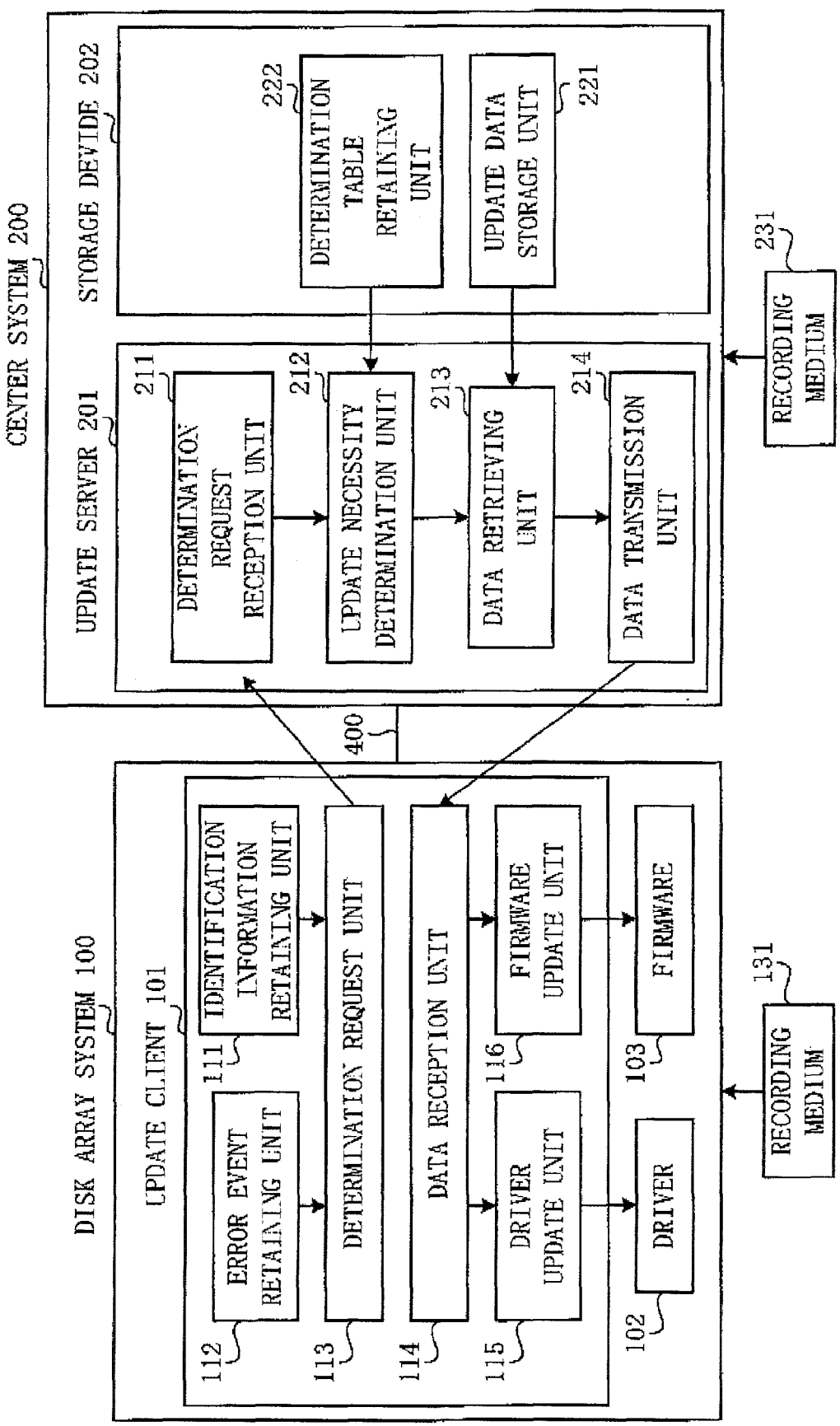
FIG. 1 is a diagram showing a structure of an update system according to a first embodiment.

As shown in FIG. 1, the update system according to the first embodiment comprises a disk array system 100 and a center system 200 which are connected to each other via a communication line 400.

The disk array system 100 comprises an update client 101. The disk array system 100 also comprises a driver 102 for a disk controller (not shown), and firmware 103.

As will be described later, the update client 101 is realized on a computer, and updates the driver 102 and the firmware 103. How to update will be described in detail later.

As shown in FIG. 1, the update client 101 comprises an identification information retaining unit 111, an error event retaining unit 112, a determination request unit 113, a data reception unit 114, a driver update unit 115, and a firmware update unit 116.

The identification information retaining unit 111 retains identification information for identifying the driver 102 and the firmware 103. The identification information includes information representing a name, a version, and the like.

The error event retaining unit 112 retains identification information for identifying an error event which occurs in the disk array system 100. The identification information includes information representing an event ID, and the like.

The determination request unit 113 sends to the center system 200 a determination request signal for requesting determination whether it is necessary or not to update the driver 102 and the firmware 103. At this time, the determination request unit 113 affixes the identification information of the driver 102 and the firmware 103 retained by the identification information retaining unit 111, and the identification information of an error event retained by the error event retaining unit 112 to the determination request signal.

The data reception unit 114 receives and stores update data for updating the driver 102 and the firmware 103 supplied from the center system 200. And the data reception unit 114 receives a non-update signal representing that there is no necessity of updating which is supplied from the center system 200.

In case of receiving update data, the data reception unit 114 outputs an update start signal for instructing start of update to the driver update unit 115 and to the firmware update unit 116. On the other hand, in case of receiving a non-update signal, the data reception unit 114 sets the update client 101 in an activation waiting state.

The driver update unit 115, in response lo an update start signal from the data reception unit 114, updates the driver 102 based on update data for the driver which is part of the update data stored in the data reception unit 114.

The firmware update unit 116, in response to an update start signal from the data reception unit 114, updates the firmware 103 based on update data for the firmware which is part of the update data stored in the data reception unit 114.

The center system 200 comprises an update server 201 and a storage device 202.

As will be described later, the update server 201 is realized on a computer. The update server 201 determines whether or not it is necessary to update the driver 102 and the firmware 103 using information stored in the storage device 202 included in a computer. In a case where it is determined that update is necessary, the update server 201 sends update data to the update client 101.

As shown in FIG. 1, the storage device 202 comprises an update data storage unit 221 and a determination table retaining unit 222.

The update data storage unit 221 stores a plurality of update data for updating the driver 102 and the firmware 103.

The determination table retaining unit 222 retains a determination table for determining whether update is necessary or not and specifying necessary update data, based on identification information of the driver 102, identification information of the firmware 103, and identification information of an error event.

The determination table is constituted by a combination table 181 shown in FIG. 2A, an error correspondence table 182 shown in FIG. 2B, and an update data table 183 shown in FIG. 2C.

The combination table 181 represents update numbers for specifying update data in accordance with combinations of the driver 102 and the firmware 103. Specifically, as shown in FIG. 2A, the combination table 181 represents update numbers (#01, etc.) in a matrix form whose row index is identification information (V1.00B00, etc.) of the driver 102, and whose column index is identification information (1.00.00, etc.) of the firmware 103.

The error correspondence table 182 represents update, numbers for specifying update data in accordance with a combination of the, driver 102 and the firmware 103, and an error event that has occurred. Specifically, as shown in FIG. 2B, the error correspondence table 182 represents update numbers (#20, etc.) in a matrix form whose row index is update numbers (#00, etc.) determined by combinations of the driver 102 and the firmware 103, and whose column index is identification information (ID:00, etc.) of error events.

By referring to the combination table 181 and the error correspondence table 182, an update number, i.e., update data can be specified in accordance with a combination of the driver 102 and the firmware 103, and a kind of an error event that has occurred. In a case where there is no error event, by referring only to the combination table 181, an update number, i.e., update data can be determined.

The update data table 183 represents information regarding update data specified by each update number. The update data information includes a storage area in the update data storage unit 221, a data name, and identification information. As shown in FIG. 2C, the update data table 183 associates each update number with corresponding update data information. In a case where update is unnecessary, no-necessity information representing that update is unnecessary is stored in the update data table 183, as shown in FIG. 2C.

The update server 201 comprises a determination request reception unit 211, an update necessity determination unit 212, a data retrieving unit 213, and a data transmission unit 214, as shown in FIG. 1.

The determination request reception unit 211 receives a determination request signal supplied from the update client 101. In response to the determination request signal, the determination request reception unit 211 outputs to the update necessity determination unit 212, a determination start signal for instructing determination of whether it is necessary or not to update the driver 102 and the firmware 103.

The update necessity determination unit 212 determines whether it is necessary or not to update the driver 102 and the firmware 103 in response to a determination start signal from the determination request reception unit 211. Specifically, the update necessity determination unit 212 refers to the determination table retained by the determination table retaining unit 222 while using die identification information of the driver 102, the identification information of the firmware 103, and the identification information of an error event which are affixed to the determination request signal. By doing so, the update necessity determination unit 212 determines whether it is necessary or not to update the driver 102 and the firmware 103.

In a case where determined that there is no necessity of updating, the update necessity determination unit 212 outputs a non-update signal representing that there is no necessity of updating to the data transmission unit 214 via the data retrieving unit 213. On the other hand, in a case where determined that update is necessary, the update necessity determination unit 212 retrieves from the determination table, update data, information regarding update data which is appropriate for updating both the driver 102 and the firmware 103 at a same time. Then, the update necessity determination unit 212 outputs the retrieved update data information to the data retrieving unit 213.

The data retrieving unit 213 retrieves from the update data storage unit 221, update data specified by the update data information supplied form the update necessity determination unit 212. Then, the data retrieving unit 213 outputs the retrieved update data to the data transmission unit 214.

The data transmission unit 214 transmits a non-update signal supplied from the update necessity determination unit 212 via the data retrieving unit 213 to the update client 101. And die data transmission unit 214 transmits update data supplied from the data retrieving unit 213 to the update client 101.

As described above, the update client 101 is realized on a computer which constitutes the disk array system 100. The update server 201 is realized on a computer which constitutes the center system 200.

A recording medium 131 and a recording medium 231 shown in FIG. 1 are a CD-ROM, a semiconductor memory, a magnetic disk, or the like. The recording medium 131 stores a program and data for realizing the update client 101 on a computer. The recording medium 231 stores a program and data for realizing the update server 201 on a computer.

The computer which constitutes the disk array system 100 reads out the program stored in the recording medium 131, and operates in accordance with the read program. Due to this, the update client 101 described above is realized on the computer The computer which constitutes the center system 200 reads out the program stored in the recording medium 231, and operates in accordance with the read program. Due to this, the update server 201 described above is realized on the computer, Further, the update data storage unit 221 and the determination table retaining unit 222 are realized on the storage device 202 which is included in the computer.

An operation of the update system will now be explained.

The update client 101 is activated regularly in accordance with, for example, a setting of the program read out from the recording medium 131. Due to this, update of the driver 102 and the firmware 103 is automatically performed as described below.

The error event retaining unit 112 retains identification information of an error event that has occurred in the disk array system 100 before the update client 101 is activated.

Figure 3A:
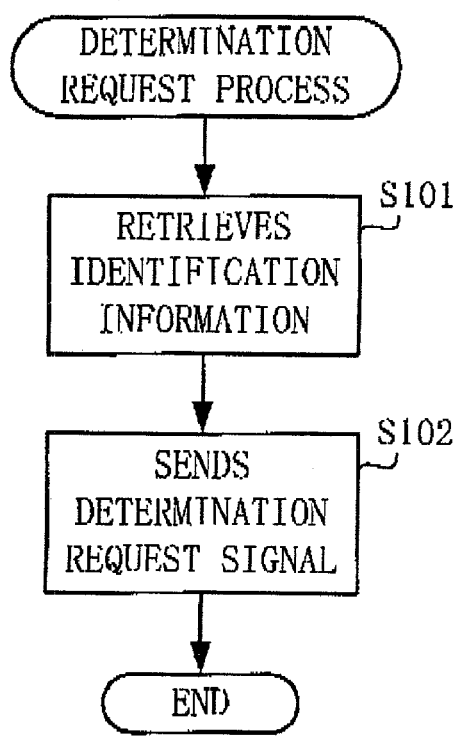
FIG. 3A is a flowchart showing a determination request process performed by a determination request unit of a disk array system which constitutes the update system shown in FIG. 1.

When the update client 101 is activated, the determination request unit 113 starts a determination request process shown in FIG. 3A.

The determination request unit 113 retrieves identification information of the driver 102 and the firmware 103 from the identification information retaining unit 111, and identification information of an error event from the error event retaining unit 112 (step S101).

The determination request unit 113 affixes the set of retrieved identification information to a determination request signal, and sends the signal to the update server 201 (step S102).

The determination request reception unit 211 of the update server 201 outputs a determination start signal to the update necessity determination unit 212 in request to the determination request signal supplied from the update client 101.

Figure 3B:
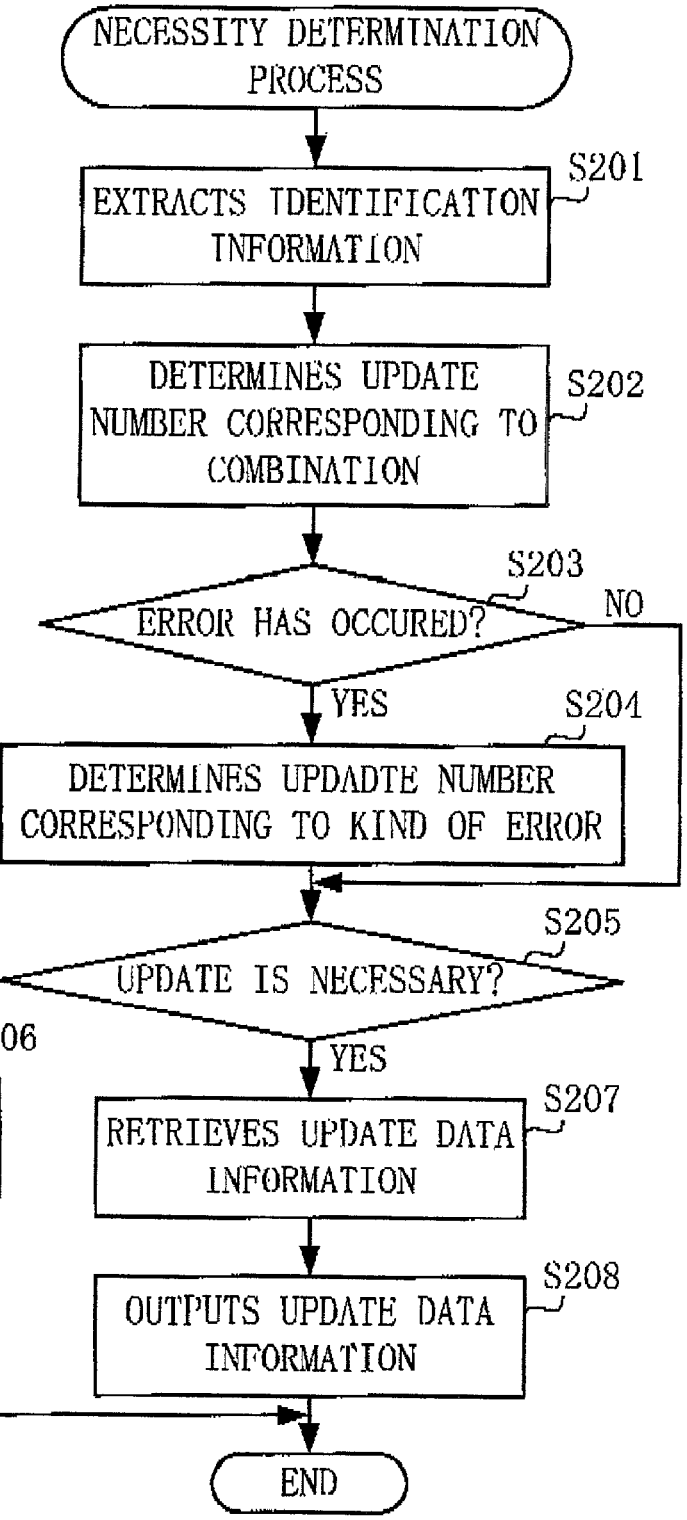
FIG. 3B is a flowchart showing a necessity determination process performed by an update necessity determination unit of the center system which constitutes the update system.
Figure 4:
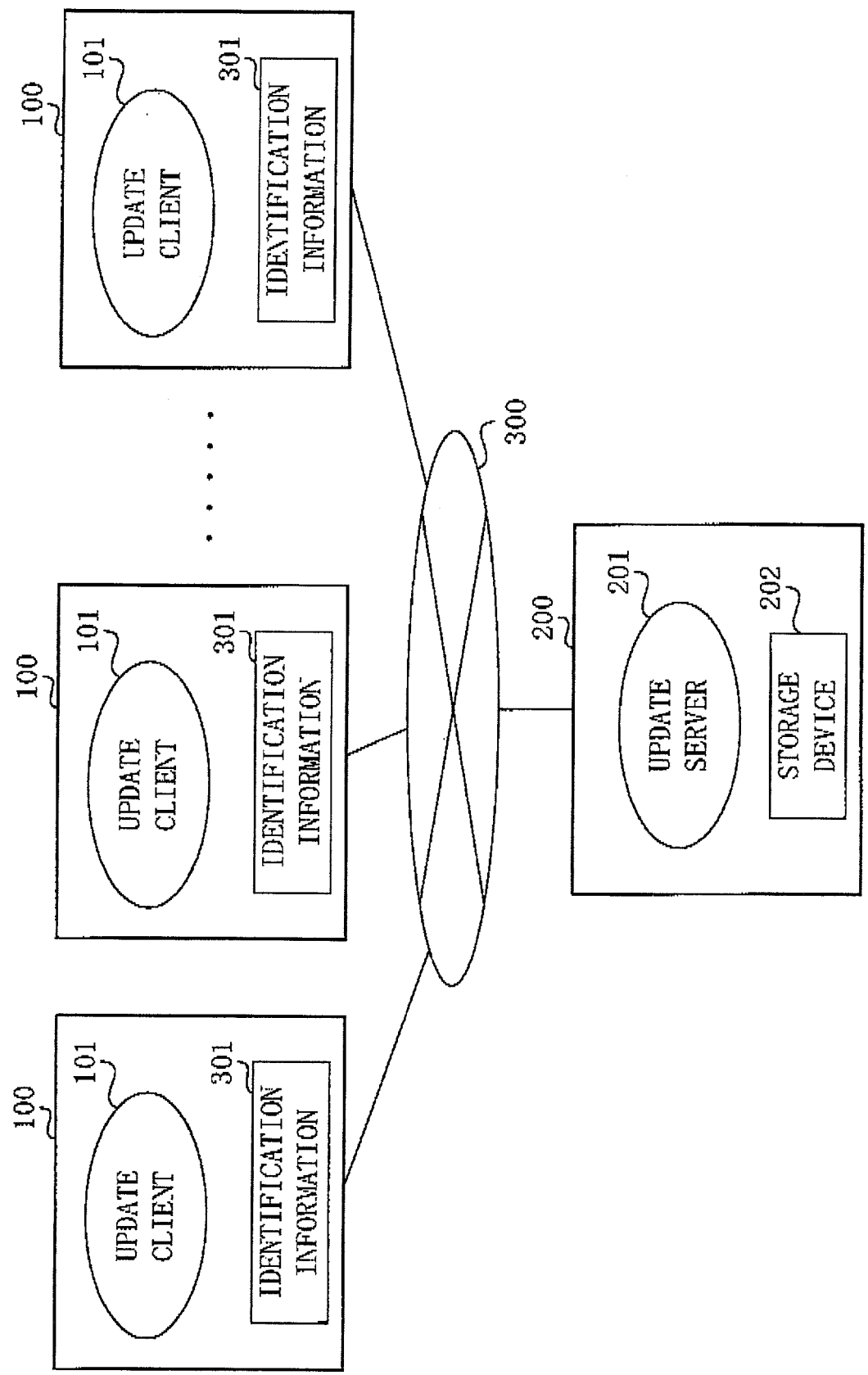
FIG. 4 is a diagram showing a structure of an update system according to a second embodiment.

The update necessity determination unit 212 starts a necessity determination process shown in FIG. 3B in response to the determination start signal from the determination request reception unit 211.

The update necessity determination unit 212 extracts the identification information of the driver 102 and the firmware 103, and the identification information of the error event from the determination request signal received by the determination request reception unit 211 (step S201).

The update necessity determination unit 212 refers to the combination table 181 retained by die determination table retaining unit 222 using the extracted identification information of the driver 102 and the firmware 103. As a result, the update necessity determination unit 212 determines an update number corresponding to the combination of the driver 102 and the firmware 103 (step S202).

For example, in a case where the identification information of the driver 102 is "V1.00B00" and the identification information of the firmware 103 is "1.00.00", the update necessity determination unit 212 decides on "#01" to be the update number.

A kind of an error event may reflect a problem of the driver 102 and/or the firmware 103. However, whether or not a problem of the driver 102 and/or the firmware 103 causes an error event depends on how well devices loaded an the same computer fit each other, and various other settings. And kinds of error events to be caused are different in accordance with how well devices fit each other and various other settings. Therefore, optimum update data (update number) cannot be determined only by the combination or the driver 102 and the firmware 103. In other words, update data (update number) should be determined not only by the combination of the driver 102 and the firmware 103 but also by the kind of an error event that has occurred.

Therefore, the update necessity determination unit 212 determines whether or not identification information of an error event has been extracted from the determination request signal. In accordance with this determination, the update necessity determination unit 212 determines whether or not an error event has occurred in the disk array system 100 (step S203).

In a case where it is determined that no error event has occurred (step S203; NO), the update necessity determination unit 212 performs a process of step S205 described later.

On the other hand, in a case where it is determined that an error event has occurred (step S203; YES), the update necessity determination unit 212 refers to the error correspondence table 182 retained in the determination table retaining unit 222 using the update number determined in step S202 and the extracted identification information of the error event. As a result, the update necessity determination unit 212 determines an update number corresponding to the kind of the error event that has occurred (step S204).

For example, in a case where the update number corresponding to the combination is "#01" and the identification information of the error event is "ID:00", the update necessity determination unit 212 decides on "#21" to the update number.

Thereafter, the update necessity determination unit 212 refers to the update data table 183 retained in the determination table retaining unit 222 using the decided update number. By doing so, the update necessity determination unit 212 determines whether or not update is necessary (step S205). Specifically, the update necessity determination unit 212 determines whether update data information is stored in the update data table 183, or no-necessity information representing that update is unnecessary is stored in the update data table 183.

In a case where it is determined that no-necessity information is stored, that is, it is determined that update is unnecessary (step S205; NO), the update necessity determination unit 212 outputs a non-update signal to the data transmission unit 214 via the data retrieving unit 213 (step S206). Then, the necessity determination process is terminated.

On the other hand, in a case where it is determined that update data information is stored, that is, it is determined that update is necessary (step S205; YES), the update necessity determination unit 212 retrieves update data information which is associated with the determined update number from the update data table 183 (step S207).

Then, the update necessity determination unit 212 outputs the retrieved update data information to the data retrieving unit 213 (step S208). Then, the necessity determination process is terminated.

The data retrieving unit 213 retrieves from the update data storage unit 221, update data which is specified by the update data information supplied from the update necessity determination unit 212.

Then, the data retrieving unit 213 outputs the retrieved update data to the data transmission unit 214.

The data transmission unit 214 transmits the update data supplied from the data retrieving unit 213 to the update client 101.

On the other hand, in a case where the data transmission unit 214 receives a non-update signal from the update necessity determination unit 212 via the data retrieving unit 213, the data transmission unit 214 transmits the received non-update signal to the update client 101.

In a case where the data reception unit 114 of the update client 101 receives a non-update signal from the update server 201, the data reception unit 114 sets the update client 101 in an activation waiting state.

On the other hand, in a case where receiving update data from the update server 201, the data reception unit 114 stores the received update data temporarily. Then, the data reception unit 114 outputs an update start signal to the driver update unit 115 and to the firmware update unit 116.

In response to the update start signal from the data reception unit 114, the driver update unit 115 updates the driver 102 based on update data for the driver which is part of the update data stored in the data reception unit 114.

In response to the update start signal from the data reception unit 114, the firmware update unit 116 updates the firmware 103 based on update data for the firmware which is part of the update data stored in the data reception unit 114.

As described above, both of the driver 102 and the firmware 103 are updated in accordance with combination of the driver 102 and the firmware 103, and the kind of the error event that has occurred. Therefore, optimum update of the driver 102 and the firmware is performed appropriately.

Second Embodiment

An update system according to a second embodiment of the present invention will now be explained with reference to the drawings.

The update system according to the second embodiment comprises a plurality of disk array systems 100 and a center system 200 which are connected to each other via a network 300 such as a LAN (Local Area Network) or the like, Each disk array system 100 is substantially the same as the disk array system 100 according to the first embodiment. The center system 200 is substantially the same as the center system 200 according to the first embodiment.

However, the center system 200 manages update of the driver 102 and the firmware 103 which are included in each of the plurality of disk array systems 100. Therefore, each disk array system 100 (or each update client 101) is given identification information (device ID) 301.

When sending a determination request signal to the update server 201, each update client 101 affixes the device ID 301 representing the sender to the determination request signal. And when the update server 201 sends update data and a non-update signal to the update client 101, the update server 201 affixes the device ID 301 representing the receiver to the update data and the non-update signal.

The update server 201 processes determination requests from the plurality of update clients 101 parallel with each other. However, a new technique for realizing this simultaneous process is not necessary. Instead, a technique such as a multi-tasking executable by ordinary software can be employed.

The specific operation for updating each driver 102 and each firmware 103 is the same as that of the first embodiment.

Due to this structure, even if a plurality of disk array systems 100 exist, the driver 102 and the firmware 103 of each disk array system 100 can be appropriately updated.

Third Embodiment

An update system according to a third embodiment of the present invention will now be explained with reference to the drawings.

Figure 5:
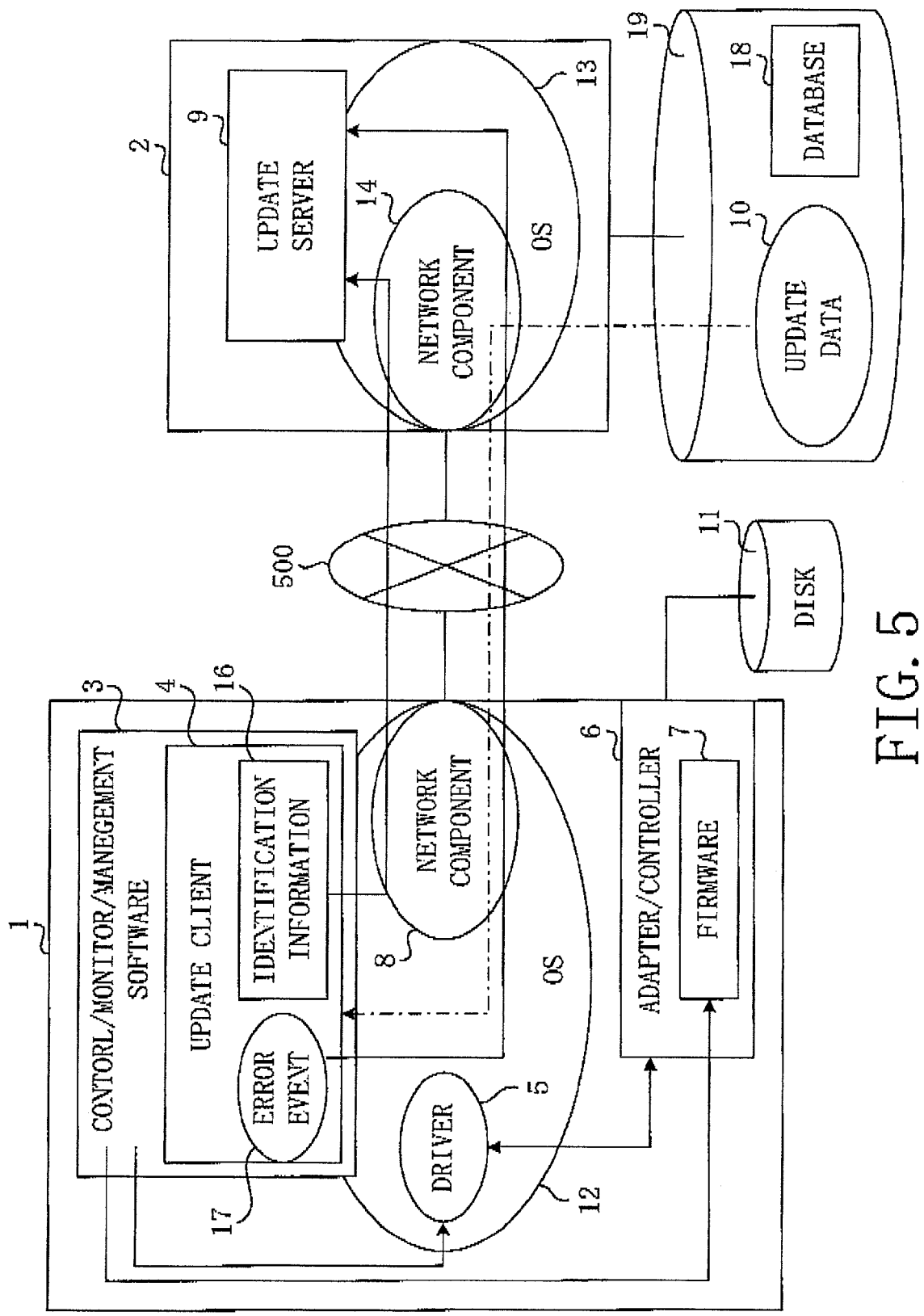
FIG. 5 is a diagram showing a structure of an update system according to a third embodiment.

As shown in FIG. 5, the update system according to the third embodiment comprises a computer 1 and a computer 2 which are connected to each other via a network 500.

The network 500 is connected to between a network component 8 of an operating system (OS) 12 which controls the computer 1, and a network component 14 of an operating system (OS) 13 which controls the computer 2.

The computer 1 constitutes a disk array system and comprises a disk 11. In FIG. 5, only one disk 11 is shown as an example. On the other hand, the computer 2 constitutes a center system and comprises a storage device 19.

Disk control/monitor/management software (utility) 3 runs on the operating system 12 of the computer 1. The utility 3 controls, monitors, and manages an adapter/controller 6 (hereinafter simply referred to as controller 6) and the disk 11.

The utility 3 has a function for updating a driver 5 and firmware 7. The utility 3 also has a function for storing identification information of an error event 17 which occurs in the utility 3, the driver 5, the controller 6, and the disk 11. For example, the utility 3 stores an error list representing an error event 17 that has occurred.

An update client 4 is software that runs on the computer 1, and corresponds to the update client 101 of the first embodiment. The update client 4 is incorporated in the utility 3 as a component of the utility 3.

The update client 4 stores and manages identification information 16 (including information representing version and build) of the driver 5 and the firmware 7. The update client 4 is regularly activated in accordance with a setting of the utility 3, a setting of the update client 4, or an external scheduler. Then, the update client 4 updates the driver 5 and the firmware 7 using the update function of the utility 3 based on update data supplied from the computer 2.

The driver 5 runs on the operating system 12, and controls input/output of the controller 6, the firmware 7, and the disk 11.

The controller 6 is loaded in the computer 1, and controls the disk 11.

The firmware 7 is stored in a memory (EEPROM or the like) of the controller 6. The firmware 7 runs on the controller 6, and controls the operation of the controller 6.

An update server 9 is software which runs on the computer 2, and corresponds to the update server 201 of the first embodiment. The update server 9 runs on the operating system 13 of the computer 2.

The update server 9 determines whether update is necessary or not in response to a request from the update client 4. In a case where it is determined that update is necessary, the update server 9 determines update data 10 which is appropriate for updating both of the driver 5 and the firmware 7. Then, the update server 9 releases the determined update data 10 to the update client 4.

A storage device 19 is a removable disk device which accommodates a CD, a DVD, and/or a magnetic tape. The storage device 19 may be connected to another computer which is connected to the network 500, as long as access by the update server 9 is ensured.

The storage device 19 stores a plurality of update data 10 for updating the driver 5 and the firmware 7. In FIG. 5, only one update data 10 is shown as an example.

The storage device 19 stores a database 18 which stores a determination table for determining update data 10 which is appropriate for updating the driver 5 and the firmware 7. The determination table stored in the database 18 is substantially the same as that of the first embodiment.

As described above, the update client 4 is incorporated in the utility 3 as a component. This is because the update of the firmware 7 is performed with the use of the function of the utility 3.

Generally, update of firmware requires a special update program. In other words, it is impossible to update firmware using an update program intended for arbitrary software. Therefore, a manufacturer of a controller usually develops a utility having a function for updating firmware for the controller. Particularly in a case where a controller is used in a disk array system, a utility is sure to be released together with the controller, so as to ensure and improve reliability.

From the above described reason, the update function of the utility 3 is used to update the firmware 7 in the present embodiment. The update function of the utility 3 is also used to update the driver 5 in the present embodiment.

An operation of the update system according to the third embodiment will now be explained.

The update client 4 is regularly activated in accordance with a setting of the utility 3, a setting of the update client 4, or an external scheduler.

Figure 6A:
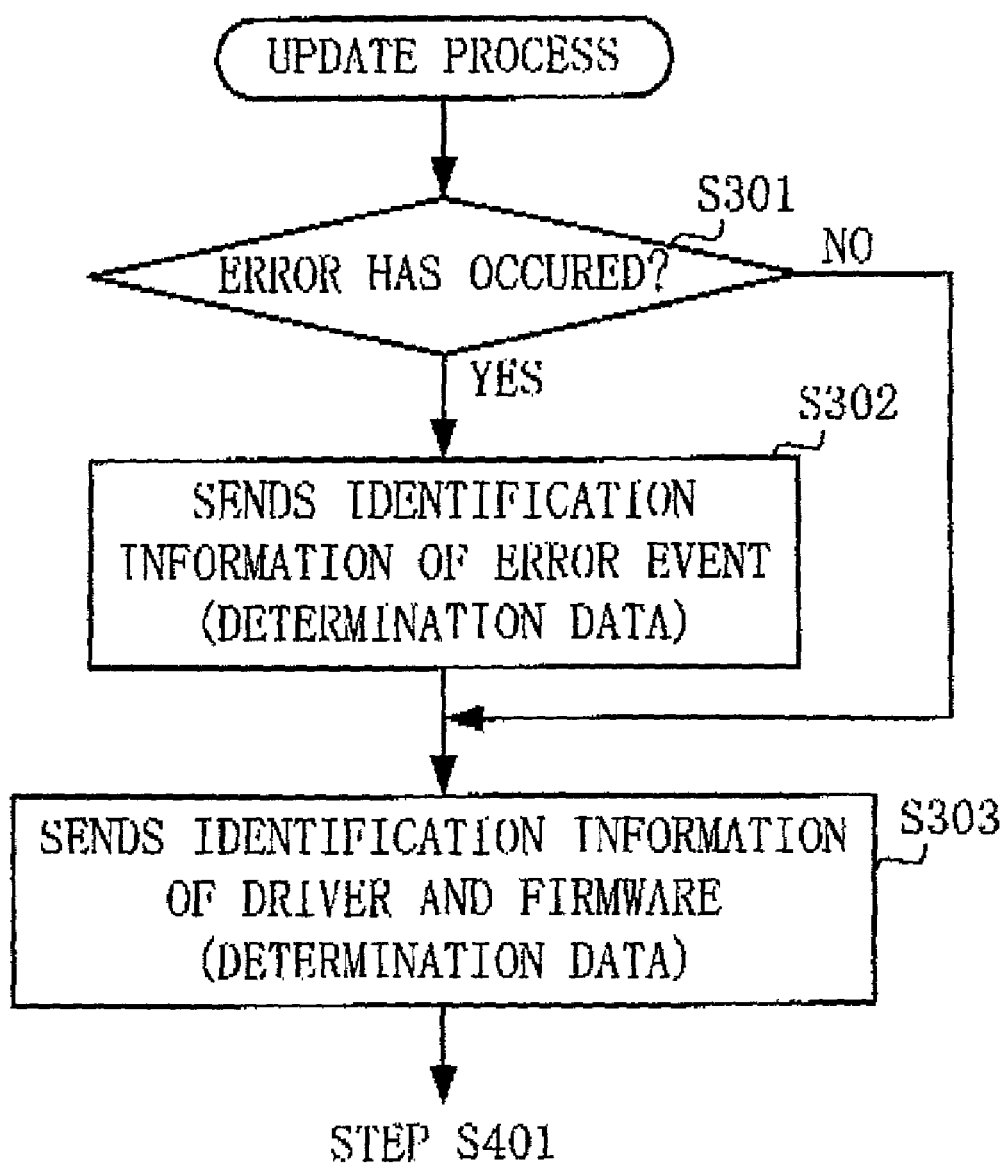
FIGS. 6A to 6C are flowcharts showing an update process performed by an update client and an update server which constitute the update system shown in FIG. 5.
Figure 6B:
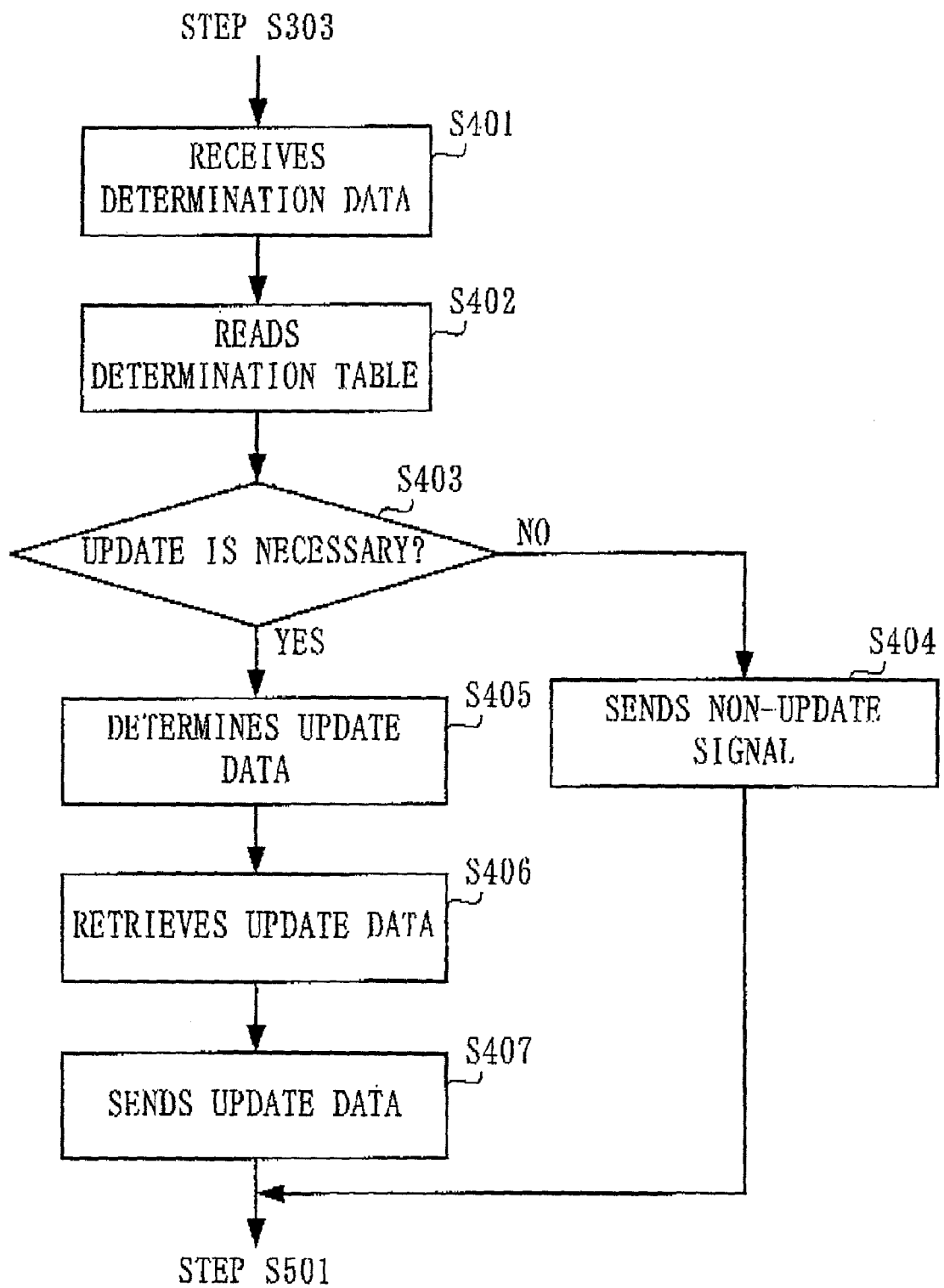
Figure 6C:
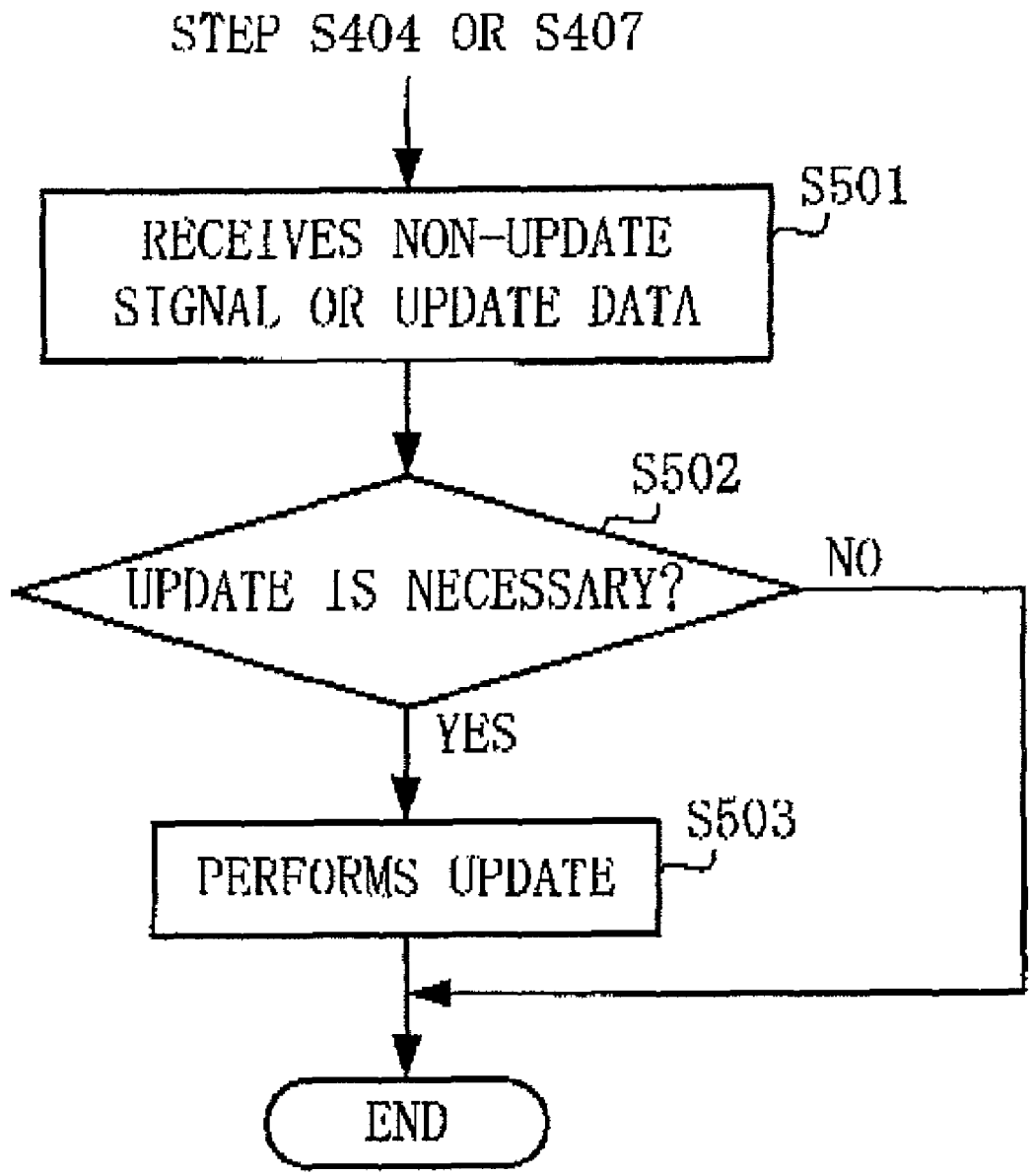

Flowcharts shown in FIG. 6A to 6C show an update process performed by the update client 4 and the update server 9 in order to update the driver 5 and the firmware 7.

When activated, the update client 4 determines whether or not an error event 17 has occurred in the utility 3, the driver 5, the controller 6, and the disk 11 (step S301). Specifically, the update client 4 determines whether or not an error event 17 has occurred by referring to the error list stored in the utility 3.

In a case where it is determined that an error event 17 has not occurred (step S301; NO), the update client 4 performs a process of step S303 to be described later.

On the other hand, in a case where it is determined that an error event 17 has occurred (step S301; YES), the update client 4 sends identification information of the error event 17 stored in the utility 3 to the update server 9 via the network 500, as determination data for determining update data (step S302).

Then, the update client 4 sends the stored identification information 16 of the driver and the firmware 7 to the update server 9 via the network 500, as determination data for determining update data (step S303).

The order of step S302 and step S303 may be reversed. If a data amount of the determination data is large, dividing the determination data into two and sending those separately may reduce load to be imposed on the network 500. However, in a case where the data amount is small, the determination data may be sent all at once. That is, the processes of step S302 and step S303 may be combined. Thus, time consumed to send the determination data can be reduced.

In a case where the determination data is sent over step S302 and step S303, the update client 4 affixes to the determination data to be sent in step S302, chain information for specifying the determination data to come after and client identification information for specifying the sender. In a case where there are a plurality of update clients 4 just as the second embodiment, the client identification information is indispensable.

The update server 9 receives the determination data supplied from the update client 4 (step S401).

Specifically, the update server 9 determines whether or not chain information and client identification information are affixed to the supplied determination data. In a case where it is determined that there is no affix, the update server 9 determines that there is no determination data to follow. Thus, the process flow goes to the next step. On the other hand, in a case where it is determined that affix is included, the update server 9 waits for the supply of the determination data to follow which is specified by the affixed chain information and client identification information. When the update server 9 receives the determination data to follow, the process flow goes to the next step.

The update server 9 reads from the storage device 19, the determination table stored in the database 18 (step S402).

The update server 9 refers to the determination table using the determination data received in step S401, and determines whether or not the driver 5 and the firmware 7 need to be updated, just like the first embodiment (step S403).

In a case where it is determined that update is unnecessary (step S403; NO), the update server 9 sends a non-update signal representing that update is unnecessary to the update client 4 (step S404).

On the other hand, in a case where it is determined that update is necessary (step S403; YES), the update server 9 determines update data 10 which is appropriate for updating the driver 5 and the firmware 7 by referring to the read determination table, just like the first embodiment (step S405).

Then, the update server 9 retrieves the determined update data 10 from the storage device 19 (step S406).

The update server 9 sends the retrieved update data 10 to the update client 4 via the network 500 (step S407).

In a case where there are a plurality (if update clients 4 just as the second embodiment, the update server 9 determines the receiver of a non-update signal or update data 10 using the client identification information affixed to the determination data received in step S401.

The update client 4 receives the non-update signal or the update data 10 supplied from the update server 9 (step S501).

Then, the update client 4 determines whether or not the driver 5 and the firmware 7 need to be updated (step S502). Specifically, the update client 4 determines whether a non-update signal is supplied, or update data 10 is supplied from the update server 9.

In a case where it is determined that a non-update signal is supplied, that is, it is determined that update is unnecessary (step S502; NO), the update client 4 terminates the update process, and will wait for activation.

On the other hand, in a case where it is determined that update data 10 is supplied, that is, it is determined that update is necessary (step S502; YES), the update client 4 updates the driver 5 and the firmware 7 using the update function of the utility 3 based on the supplied update data 10 (step S503).

A method of updating the driver 5 may be arbitrarily chosen. For example, the driver 5 may be updated by a method of updating ordinary software (for example, a patch method and the like). Also, a method of updating the firmware 7 may be arbitrarily chosen. For example, the firmware 7 may be updated by an existing method (for example, rewriting the old firmware 7 stored in the memory of the controller 6 into new firmware 7).

Thus, the update process is terminated, and the update client 4 will wait for activation.

In a case where reactivation of the computer I is required after the driver 5 and the firmware 7 are updated, die update client 4 may instruct the operating system 12 to reactivate the computer 1 after the update process is terminated.

As described above, the necessity of update, together with appropriate update data are determined in accordance with the combination of the driver 5 and the firmware 7, and further, the kind of an error event 17 that has occurred. Therefore, it is possible to prevent disorder which may be caused when only one of the driver 5 and the firmware 7 is updated. And update of both of the driver 5 and the disk firmware 7 can be performed securely and easily.

The update client 101 and the update server 201 may be structured integrally. In other words, the update client 101 and the update server 201 may be realized on a same computer. For example, the update server 201 may be provided in the disk array system 100.

The apparatuses of the present invention can be realized by general computers, without the need for dedicated apparatuses. Programs and data for controlling computers to execute the above-described processes may be recorded on media (floppy disk, CD-ROM, DVD, or the like) and distributed, and the programs may be installed into the computers and run on an OS (Operating System) to execute the above-described processes, thereby achieving the apparatuses of the present invention. The above programs and data may be stored in a disk device or the like included in the server device on the Internet, and embedded in a carrier Wave. The programs and data embedded in the carrier wave may be downloaded into the computers so as to realize the apparatuses of the present invention.

Various embodiments and changes may be made thereunto without departing from the broad spirit and scope of the invention. The above-described embodiments are intended to illustrate the present invention, not Lo limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-080415 filed on Mar. 21, 2001 and including specification, claims, drawings and summary. The disclosure of the above Japanese Patent Application is incorporated herein by reference in its entirety.

What is claimed is:

1. An update system comprising:
an update client which updates a driver and firmware which are included in a disk array system; and
an update server which is connected to said update client via a communication line, wherein the update server determines whether updating said driver and said firmware is necessary based on driver identification information, firmware identification information and error event information, which are received from said update client,
wherein the update client detects error events that occur in said disk array system and stores identification information identifying an error event that is detected as the error event information, and the update client transmits the error event information, the firmware identification information, and the driver identification information to the update server if the error event is detected in the disk array system,
wherein the update server selects update data for the driver and the firmware based on the driver identification information, the firmware identification information and the error event information received from said update client and sends the update data which is selected to the update client if updating the driver and the firmware is determined to be necessary,
wherein said update client updates both of said driver and said firmware with the update data which is received from said update server.

2. The update system according to claim 1, wherein:
said update client comprises:
an information sending unit which sends the driver identification information, the firmware identification information and the error event information to said update server; and
an update unit which updates both of said driver and said firmware using the update data which is received from said update server, and
said update server comprises:
a necessity determination unit which determines whether updating the driver and the firmware is necessary based on the driver identification information, the firmware identification information, and the error event information which are received from the information sending unit;

a data determination unit which selects the update data based on the driver identification information, the firmware identification information and the error event information which are received from the information sending unit if said necessity determining unit determines that the update is necessary; and a data sending unit which sends the update data which is determined by said data determination unit to said update client.

3. The update system according to claim 2, wherein:

said update server further comprises a storage unit which stores a determination table which indicates whether the update is necessary, and specifies update data which corresponds to a combination of the driver identification information, the firmware identification information and the error event information;

said necessity determination unit determines whether the update is necessary by referring to said determination table using the driver identification information, the firmware identification information and the error event information; and said data determination unit selects the update data by referring to said determination table using the driver identification information, the firmware identification information and the error event information.

4. The update system according to claim 3, wherein:

said storage unit stores a plurality of update data for updating both of said driver and said firmware;

said update server further comprises a data retrieving unit which retrieves the update data which is selected by said data determination unit; and said data sending unit sends the update data which is retrieved by said data retrieving unit to said update client.

5. The update system according to claim 4, wherein said update client is provided in said disk array system.

6. The update system according to claim 1, wherein the error event information identifies a type of error event which occurs in the disk array system.

7. The update system according to claim 1, wherein the update client further comprises a determination request unit which sends a determination request signal to the update server for requesting determination of whether the update of the firmware and the driver is necessary, wherein the determination request signal includes the driver identification information, the firmware identification information and the error event information.

8. The update system according to claim 3, wherein the determination table includes update numbers which specify update data that corresponds to a plurality of combinations of driver identification information, firmware identification information and error event information, and the data determination unit selects the update data based on an update number which corresponds to the combination of the driver identification information, the firmware identification information and the error event information which is received from the update client.

9. The update system according to claim 8, wherein:

said storage unit further stores a plurality of update data for updating both of said driver and said firmware;

said update server further comprises a data retrieving unit which retrieves from said storage unit, the update data determined by said data determination unit; and said data sending unit sends the update data retrieved by said data retrieving unit to said update client.

10. The update system according to claim 9, wherein said update client is provided in said disk array system.

11. A method of updating a driver and firmware, the method comprising:

determining, at an update server, whether updating the driver and the firmware which are included in a disk array system is necessary based on driver identification information, firmware identification information and error event information, which are received from an update client, wherein the update client detects error events that occur in said disk array system and stores identification information identifying an error event that is detected as the error event information, and the update client transmits the error event information, the firmware identification information, and the driver identification information to the update server if the error event is detected in the disk array system;

selecting update data for the driver and the firmware based on the driver identification information, the firmware identification information and the error event information received from said update client and sending the update data which is selected from the update server to the update client if updating the driver and the firmware is determined to be necessary; and updating both of said driver and said firmware with the update data which is received from the update client.

12. The method of claim 11, wherein said determining comprises referring to a determination table which indicates whether the update is necessary and specifies update data which corresponds to a combination of the driver identification information, the firmware identification information and the error event information, and said selecting comprises selecting the update data by referring to said determination table using the driver identification information, the firmware identification information, and the error event information.

13. The method of claim 11, wherein the update client is provided in the disk array system.

14. The method of claim 11, wherein the error event information identifies a type of error event which occurs in the disk array system.

15. The method of claim 11, further comprising sending, from the update client, a determination request signal to the update server for requesting determination of whether the update of the firmware and the driver is necessary, wherein the determination request signal includes the driver identification information, the firmware identification information, and the error event information.

16. The method of claim 12, wherein the determination table includes update numbers which specify update data that corresponds to a plurality of combinations of driver identification information, firmware identification information, and error event information, and said selecting comprises selecting the update data based on an update number which corresponds to the combination of driver identification information, firmware identification information, and error event information which is received from the update client.

17. A computer readable medium storing a program which executes a method of updating a driver and firmware, the method comprising:

determining, at an update server, whether updating the driver and the firmware which are included in a disk array system is necessary based on driver identification information, firmware identification information and error event information, which are received from an update clients, wherein the update client detects error events that occur in said disk array system and stores identification information identifying an error event that is detected as the error event information, and the update client transmits the error event information, the firmware identification information, and the driver identification information to the update server if the error event is detected in the disk array system;

selecting update data for the driver and the firmware based on the driver identification information, the firmware identification information, and the error event information received from said update client and sending the update data which is selected from the update server to the update client if updating the driver and the firmware is determined to be necessary; and updating both of said driver and said firmware using the update data which is received from the update client.

18. The computer readable medium according to claim 17, wherein said determining comprises referring to a determination table which indicates whether the update is necessary and specifies update data which corresponds to a combination of the driver identification information, the firmware identification information and the error event information, and said selecting comprises selecting the update data by referring to said determination table using the driver identification information, the firmware identification information, and the error event information.

* * * * *